United States Patent
Van De Wege, I et al.

(10) Patent No.: US 7,481,328 B1
(45) Date of Patent: Jan. 27, 2009

(54) SEMI-TRACTOR CAB ORGANIZER

(76) Inventors: Larry Van De Wege, I, 1421 N. 43rd St., Sheboygan, WI (US) 53081; Pamela Van De Wege, 1421 N. 43rd St., Sheboygan, WI (US) 53081

( * ) Notice: Subject to any disclaimer, the term of this patent is extended or adjusted under 35 U.S.C. 154(b) by 597 days.

(21) Appl. No.: 11/159,940

(22) Filed: Jun. 23, 2005

Related U.S. Application Data

(60) Provisional application No. 60/587,282, filed on Jul. 12, 2004.

(51) Int. Cl.
- B65D 25/04 (2006.01)
- B60R 7/02 (2006.01)
- B60R 9/00 (2006.01)
- B65D 1/24 (2006.01)

(52) U.S. Cl. .................. 220/505; 220/532; 220/533; 224/402

(58) Field of Classification Search .......... 224/539, 224/402; 220/505, 503, 529, 532, 533, 544, 220/543; 297/188.2
See application file for complete search history.

(56) References Cited

U.S. PATENT DOCUMENTS

| | | | |
|---|---|---|---|
| 1,490,538 A | 4/1924 | Owen | |
| 1,739,730 A * | 12/1929 | Orthwine | 211/128.1 |
| 1,951,261 A | 3/1934 | Thompson | |
| 1,964,339 A | 6/1934 | Brassell | |
| 2,524,909 A | 10/1950 | Hines | |
| 2,587,302 A | 2/1952 | Fawcett | |
| 2,640,595 A | 6/1953 | Byford | |
| 2,678,682 A | 5/1954 | Thomas | |
| 2,692,638 A | 10/1954 | Castell | |
| 2,797,739 A | 7/1957 | Orsini | |
| 2,897,974 A | 8/1959 | Cook | |
| 2,934,391 A | 4/1960 | Bohnett | |
| 2,971,572 A | 2/1961 | Watkins | |
| 3,022,107 A | 2/1962 | Daniels | |
| 3,051,539 A | 8/1962 | Montgomery | |
| 3,061,394 A | 10/1962 | Whetstone | |
| 3,083,998 A | 4/1963 | Morris | |
| 3,089,583 A | 5/1963 | White | |
| 3,104,131 A * | 9/1963 | Krone | 297/411.24 |
| 3,110,397 A | 11/1963 | Peck et al. | |

(Continued)

FOREIGN PATENT DOCUMENTS

DE 103 21 837 5/2003

(Continued)

Primary Examiner—Anthony D Stashick
Assistant Examiner—Niki M Eloshway
(74) Attorney, Agent, or Firm—Andrus, Sceales, Starke & Sawall, LLP

(57) ABSTRACT

An organizer is adapted to store and manage various items in a vehicle. The organizer includes a pair of spaced-apart sidewalls interconnected by a bottom panel with each sidewall having a front face and a rear face. One of the sidewalls is adapted to be oriented towards the driver of the vehicle having an internal support shelf extending inwardly from the one sidewall, and an external support shelf projecting outwardly from the one sidewall. A series of vertically disposed, spaced-apart parallel panels extend completely between the sidewalls at various locations between the front faces and the rear faces of the sidewalls for defining a series of adjacently disposed, open-topped storage compartments for holding the various items in the vehicle.

4 Claims, 4 Drawing Sheets

U.S. PATENT DOCUMENTS

| | | | | |
|---|---|---|---|---|
| 3,136,461 | A | 6/1964 | Gregg, Jr. | |
| 3,163,287 | A | 12/1964 | Barnett | |
| D199,993 | S | 1/1965 | Cohen | |
| 3,177,033 | A | 4/1965 | Daniels | |
| D202,384 | S | 9/1965 | Wilson | |
| D205,400 | S | 8/1966 | Bray | |
| 3,291,353 | A | 12/1966 | Sobczak | |
| 3,304,143 | A | 2/1967 | Connell | |
| 3,311,276 | A | 3/1967 | Fromm | |
| 3,312,436 | A | 4/1967 | Beghetto | |
| 3,318,456 | A | 5/1967 | Lipe | |
| D207,916 | S | 6/1967 | White | |
| D208,217 | S | 8/1967 | Castloo | |
| 3,338,629 | A * | 8/1967 | Drees | 312/235.8 |
| 3,345,118 | A | 10/1967 | Cummings | |
| 3,356,409 | A | 12/1967 | Belsky et al. | |
| 3,499,540 | A * | 3/1970 | Huncovsky | 211/60.1 |
| 3,517,978 | A * | 6/1970 | Hudson | 312/235.8 |
| 3,561,589 | A | 2/1971 | Larkin, Jr. | |
| 3,589,577 | A | 6/1971 | Basinger | |
| 3,606,112 | A | 9/1971 | Cheshier | |
| 3,632,158 | A | 1/1972 | Boothe | |
| 3,804,233 | A | 4/1974 | Gregg, Jr. | |
| D232,871 | S | 9/1974 | George et al. | |
| 3,873,010 | A | 3/1975 | Patterson | |
| 3,893,569 | A | 7/1975 | Hoch | |
| 3,899,982 | A | 8/1975 | Fetzek | |
| 3,909,092 | A * | 9/1975 | Kiernan | 312/235.8 |
| 3,922,973 | A | 12/1975 | Sturgeon | |
| 3,951,486 | A | 4/1976 | Tracy | |
| 4,084,699 | A * | 4/1978 | Koepke | 211/11 |
| D248,056 | S | 5/1978 | Nepper | |
| 4,087,126 | A | 5/1978 | Wynn | |
| 4,146,159 | A | 3/1979 | Hemmen | |
| 4,300,709 | A | 11/1981 | Page, Jr. | |
| 4,423,812 | A | 1/1984 | Sato | |
| 4,436,215 | A * | 3/1984 | Kleinert et al. | 220/533 |
| 4,453,759 | A | 6/1984 | Kathiria | |
| 4,511,072 | A | 4/1985 | Owens | |
| 4,512,503 | A | 4/1985 | Gioso | |
| 4,535,923 | A | 8/1985 | Manke | |
| 4,577,788 | A | 3/1986 | Richardson | |
| 4,619,386 | A | 10/1986 | Richardson | |
| 4,792,184 | A | 12/1988 | Lindberg et al. | |
| 4,796,791 | A | 1/1989 | Goss et al. | |
| 4,809,897 | A | 3/1989 | Wright | |
| 4,819,795 | A * | 4/1989 | Swaney | 206/278 |
| 4,828,211 | A | 5/1989 | McConnell et al. | |
| 4,832,241 | A | 5/1989 | Radcliffe | |
| 4,848,626 | A * | 7/1989 | Waters | 224/404 |
| 4,911,296 | A * | 3/1990 | Hart, Jr. | 206/373 |
| 4,928,865 | A | 5/1990 | Lorence et al. | |
| 4,940,275 | A | 7/1990 | Miki et al. | |
| 4,942,990 | A * | 7/1990 | White | 224/42.33 |
| 4,943,111 | A | 7/1990 | VanderLaan | |
| 4,949,890 | A | 8/1990 | Schultz | |
| D311,450 | S | 10/1990 | Burns | |
| 5,024,411 | A | 6/1991 | Elwell | |
| D322,887 | S | 1/1992 | Kraker | |
| 5,085,481 | A | 2/1992 | Fluharty et al. | |
| 5,092,507 | A | 3/1992 | Szablak et al. | |
| 5,205,452 | A | 4/1993 | Mankey | |
| 5,282,556 | A | 2/1994 | Bossert | |
| 5,294,026 | A | 3/1994 | McGirt | |
| 5,316,368 | A | 5/1994 | Arbisi | |
| 5,326,064 | A | 7/1994 | Sapien | |
| D352,495 | S | 11/1994 | Mawhinney et al. | |
| 5,390,887 | A | 2/1995 | Campbell | |
| D368,890 | S | 4/1996 | Morris | |
| 5,551,616 | A * | 9/1996 | Stitt et al. | 224/275 |
| 5,628,439 | A | 5/1997 | O'Hara | |
| 5,863,089 | A | 1/1999 | Ignarra et al. | |
| 6,015,198 | A * | 1/2000 | Stair | 312/235.1 |
| 6,045,173 | A | 4/2000 | Tiesler et al. | |
| 6,116,674 | A | 9/2000 | Allison et al. | |
| 6,129,400 | A | 10/2000 | Jakubiec et al. | |
| 6,152,514 | A * | 11/2000 | McLellen | 296/37.8 |
| 6,250,729 | B1 | 6/2001 | Allison | |
| 6,338,429 | B1 * | 1/2002 | Pesce | 224/539 |
| 6,343,835 | B1 * | 2/2002 | Ledbetter | 297/188.2 |
| 6,367,857 | B2 | 4/2002 | Kifer et al. | |
| 6,422,440 | B1 * | 7/2002 | Stone | 224/275 |
| 6,505,802 | B2 | 1/2003 | Fowler | |
| 6,575,293 | B2 * | 6/2003 | Foster | 198/750.2 |
| 6,644,526 | B2 | 11/2003 | Pegorier | |
| 6,719,343 | B2 | 4/2004 | Emerling et al. | |
| 6,726,267 | B2 | 4/2004 | Kim et al. | |
| 6,761,388 | B2 * | 7/2004 | Lein et al. | 296/24.34 |
| 6,832,745 | B2 | 12/2004 | Lindsay | |
| 6,851,736 | B1 * | 2/2005 | Klopp et al. | 296/37.8 |
| 6,959,811 | B1 * | 11/2005 | Hoover | 206/315.11 |
| 6,966,450 | B2 * | 11/2005 | Askew | 220/529 |
| 2002/0175531 | A1 | 11/2002 | Worrell et al. | |
| 2003/0047955 | A1 | 3/2003 | Bruhnke et al. | |
| 2003/0127877 | A1 | 7/2003 | Luginbill et al. | |
| 2003/0234550 | A1 | 12/2003 | Brooks et al. | |
| 2005/0035618 | A1 | 2/2005 | Toth et al. | |

FOREIGN PATENT DOCUMENTS

| | | |
|---|---|---|
| EP | 1 316 473 | 6/2003 |
| EP | 1 431 108 | 12/2003 |
| EP | 1 479 565 | 11/2004 |
| WO | WO 2004/024508 | 3/2004 |
| WO | WO 2004/071813 | 8/2004 |

* cited by examiner

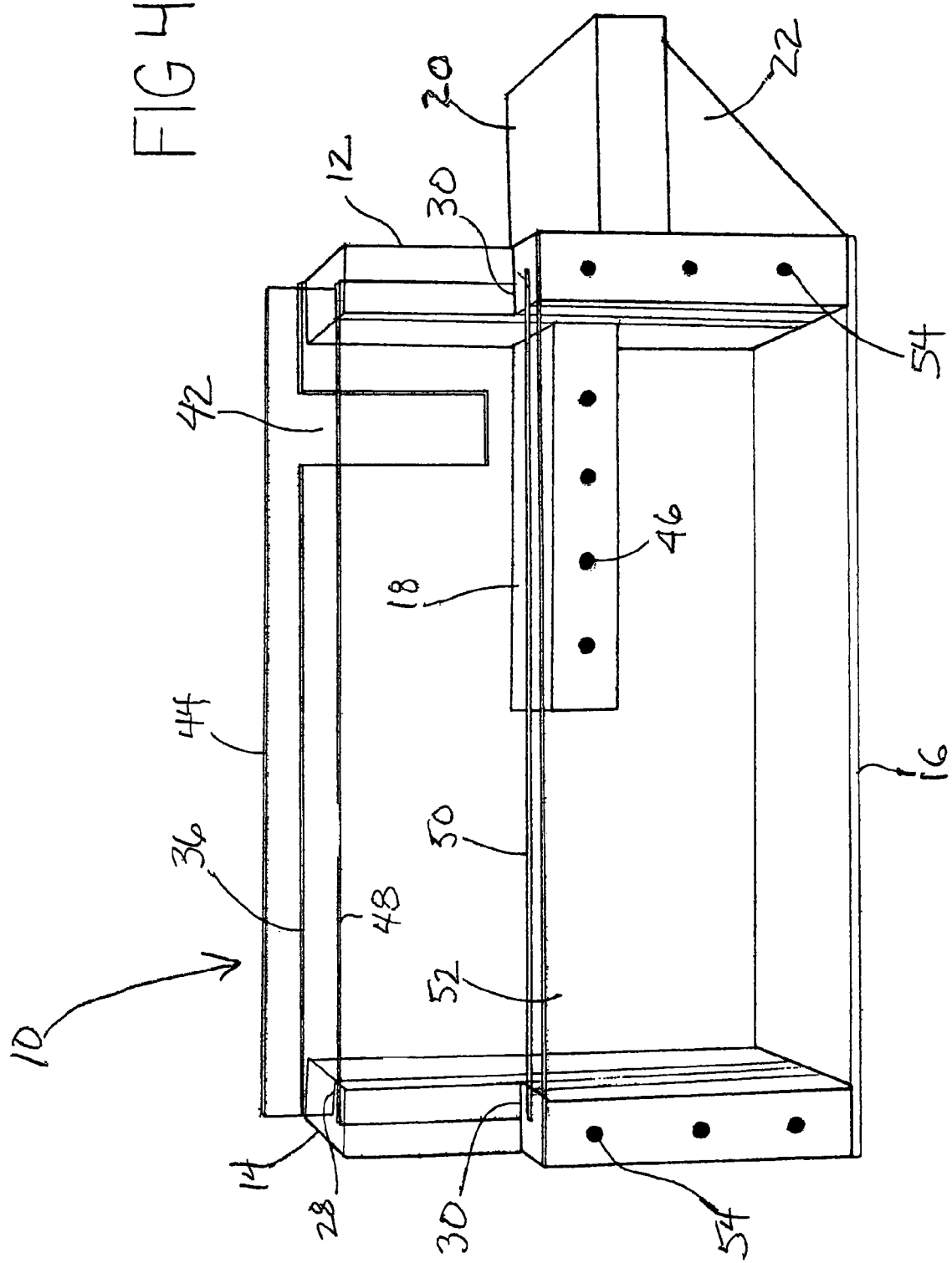

SEMI-TRACTOR CAB ORGANIZER

CROSS-REFERENCE TO RELATED APPLICATIONS

This application relates to and claims priority based on U.S. Provisional Patent Application Ser. No. 60/587,282 filed Jul. 12, 2004.

FIELD OF THE INVENTION

The present invention relates generally to vehicle organizers, and, more particularly, pertains to semi-truck cab organizers which provide professional truck drivers with a storage device to hold and manage common items of use and on-the-job necessities that are easily accessible.

BACKGROUND OF THE INVENTION

As a necessary adjunct to their job, many people today spend a large portion of their working hours riding in or driving automobiles, trucks and other vehicles. Semi-truck drivers, for example, may spend a substantial part of their time traveling from one place of business to another, and conduct a substantial amount of their business in or from the vehicle itself. Truck drivers tend to accumulate in their vehicles log books, maps, clip boards, manifests, envelopes, folders, notebooks and other papers and paraphernalia of their business with such material accumulating on the seats, dashboard and floor of the vehicle. Such accumulations can create a danger to the driver and passengers in the vehicle in the case of sudden stops or turns, in addition to being unsightly and inconvenient. Further, papers and other articles strewn about the vehicle are difficult to locate often sliding out of reach when the vehicle is in motion, and this results in lost time when the material is to be located, and can divert the driver's attention from the road.

Accordingly, there has long been a need for a convenient, easy to reach storage device for use in vehicles which would provide room for organized storage of the papers and other articles such as scanners, cell phones, lap tops, PDA's, video games, cameras, beverage containers, flashlights, sun glasses, pens, coins, tapes/CD's, and cleaning products often carried in vehicles. Such a storage device must be conveniently located to the driver or passenger, should be easily removable and should provide storage facilities for a variety of different articles.

SUMMARY OF THE INVENTION

The invention relates to an organizer adapted to store and manage various items in a vehicle. The organizer includes a pair of spaced-apart, sidewalls interconnected by a bottom panel with each sidewall having a front face and a rear face. One of the sidewalls is adapted to be oriented towards the driver of the vehicle and has an internal support shelf extending inwardly from the one sidewall, and an external support shelf projecting outwardly from the one sidewall. A series of vertically disposed, spaced-apart, parallel panels extend completely between the sidewalls at various locations between the front faces and the rear faces of the sidewalls for defining a series of adjacently disposed, open-topped storage compartments for holding the various items in the vehicle.

The sidewalls have a reverse L-shape provided with a front portion and a rear portion smaller than the front portion. The bottom and the vertically disposed panels are preferably transparent. The internal surfaces of the sidewalls are formed with retaining grooves for slidably receiving and retaining certain of vertically disposed panels. The vertically disposed panels include a front panel fixed to the front faces of the sidewalls. The front panel is further attached to the internal support shelf. The vertically disposed panels include a rear panel fixed to rear faces of the sidewalls. The front panels are formed with a cut-out adapted to receive a handle of a cup which is adapted to be held on the internal support shelf. The front portions of the sidewalls are larger than the rear portions. The vertically disposed panels include a first interior panel connected to the internal support shelf and having side edges retained in the front portions of the sidewalls. The vertically disposed panels also include a second interior panel spaced rearwardly from the first interior panel and having side edges retained in the front portions of the sidewall. The vertically disposed panels further include a third interior panel spaced rearwardly of the second interior panel and having side edges retained in the rear portions of the sidewall.

In another aspect of the invention, a readily visible and open-topped organizer is adapted to be used for storing and managing items in the cab of a semi-tractor vehicle. The organizer includes a pair of spaced-apart, generally L-shaped sidewalls interconnected by a transparent bottom panel with each sidewall having a front face and a rear face. The sidewalls also have internal surfaces formed with spaced-apart retaining grooves. One of the sidewalls is adapted to be oriented towards a driver of the vehicle, and has an internal support shelf extending inwardly from the one sidewall and an external support shelf projecting outwardly from the one sidewall. A series of vertically disposed, spaced-apart, parallel, transparent panels extend between the sidewalls at various locations between the front faces and the rear faces of the sidewall for defining a series of adjacently disposed storage compartments adapted to hold paperwork and various items in the vehicle. Certain of the vertically disposed panels are fixed to the front and rear faces of the sidewalls and other vertically disposed panels are slidably retained within retaining grooves formed in the internal surfaces of the sidewalls. The internal support shelf is located between one of the fixed panels and one of the slidably retained panels. One of the fixed panels has a cut-out adapted to receive a handle of a container which is adapted to be supported on the internal support shelf.

Various features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a rear perspective view of the cab organizer.

DETAILED DESCRIPTION OF THE INVENTION

Figure 1:
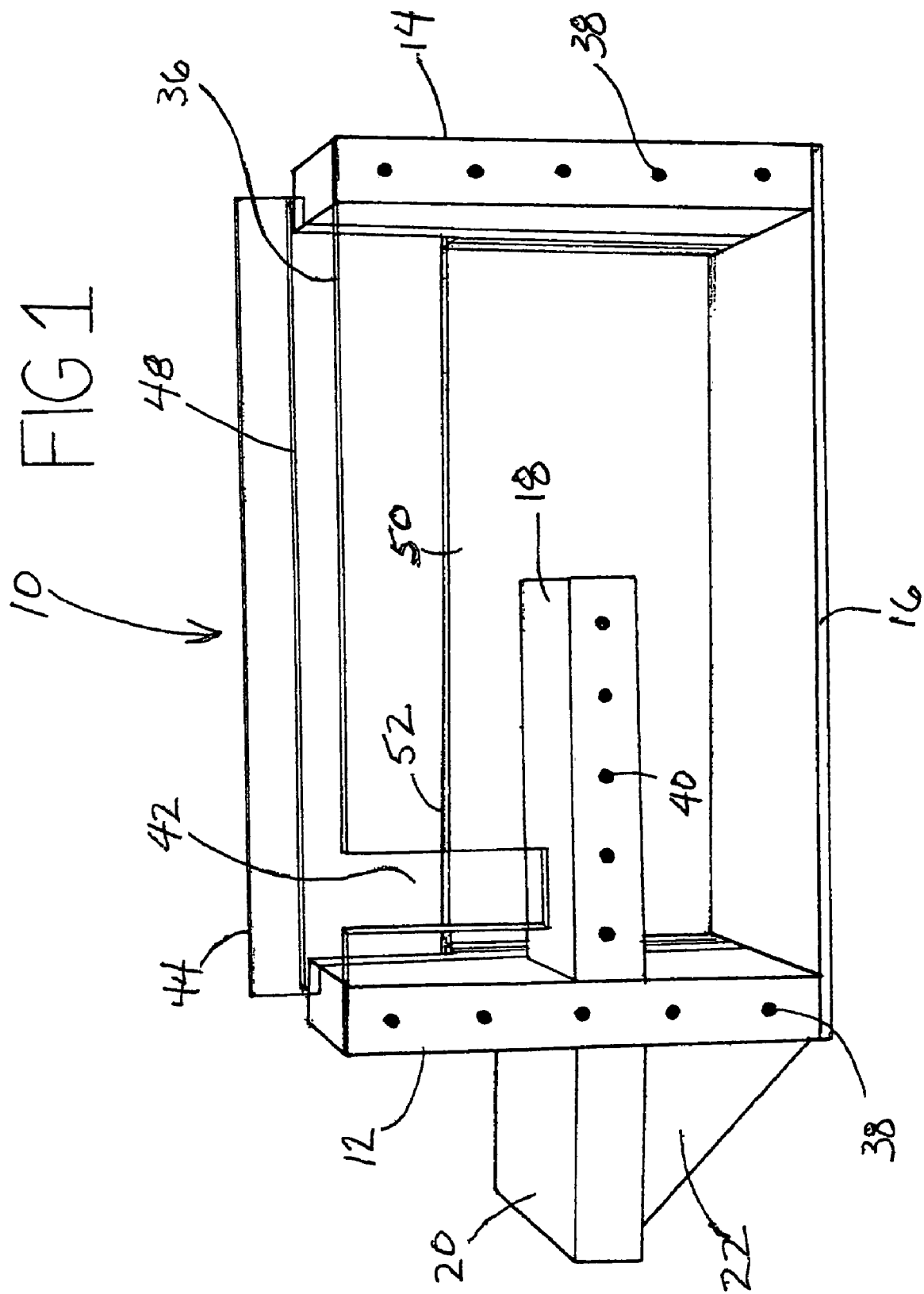
FIG. 1 is a front perspective view of the cab organizer embodying the present invention.
Figure 2:
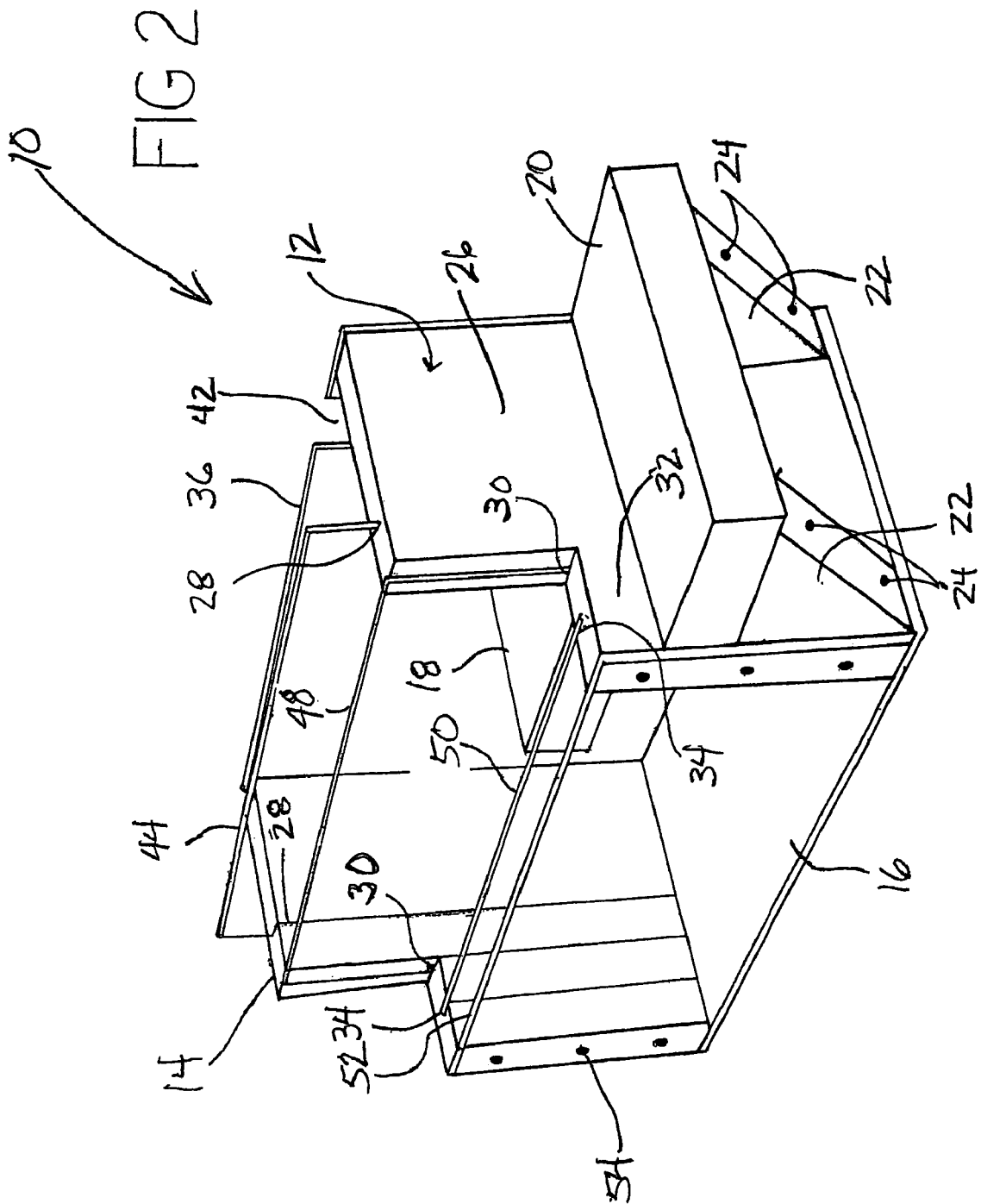
FIG. 2 is a perspective view taken from the left side and rear of the cab organizer.
Figure 3:
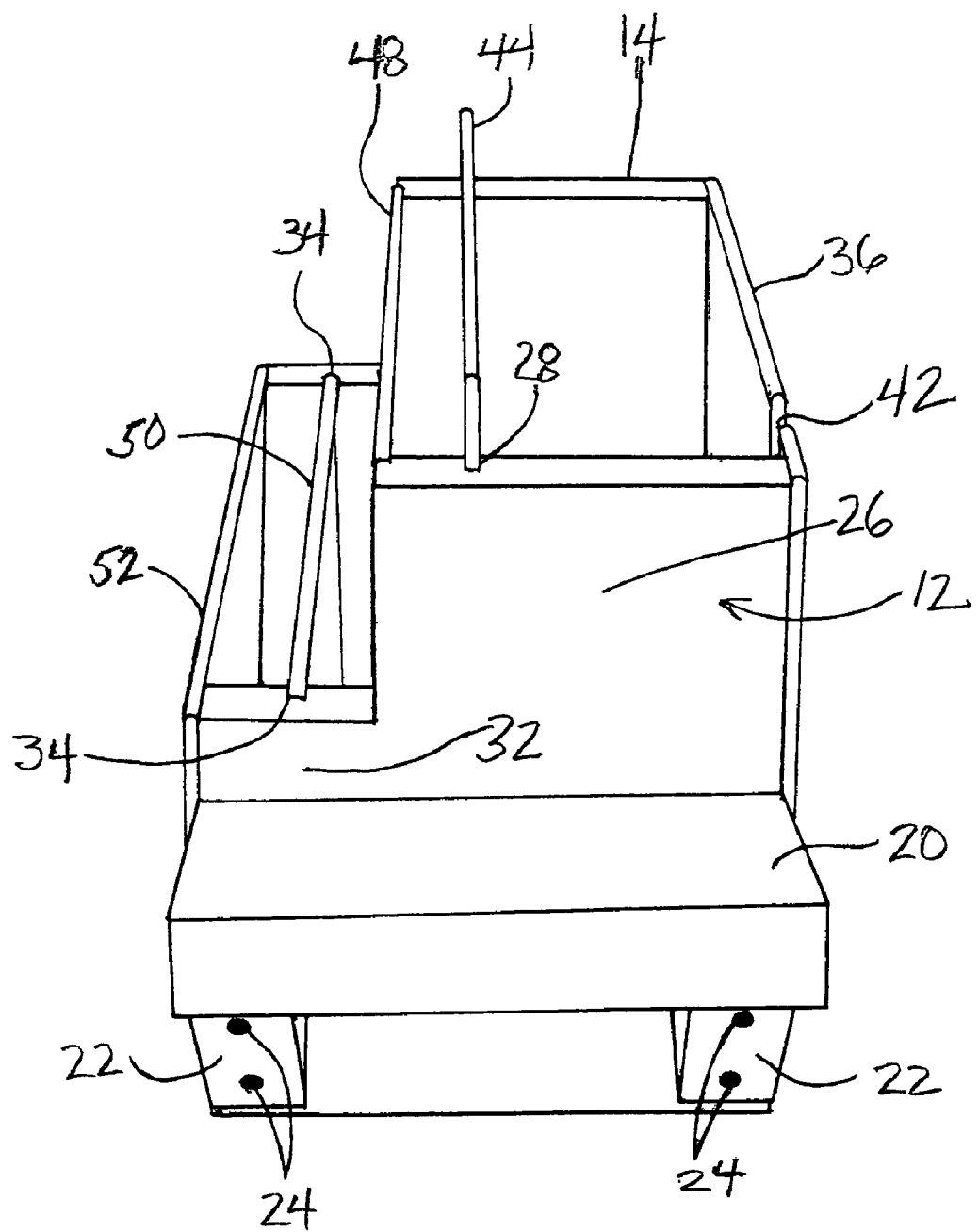
FIG. 3 is a perspective view taken from the left side of the cab organizer.

Referring now to FIGS. 1-4, thereshown is a cab organizer 10 adapted to be positioned such as on the floor of a semi-tractor cab. The organizer 10 includes a pair of spaced-apart, solid sidewalls 12, 14 made of wood or plastic, for example, which are substantially identical in size and have a reverse L-shape in profile. The sidewalls 12, 14 are interconnected by a rectangular, planar bottom panel 16 preferably constructed of transparent Plexiglas material. Any suitable means such as fasteners (not shown) may be used to secure outer edges of the bottom panel 16 to the lower ends of the sidewalls 12, 14.

An internal support shelf 18, preferably used to support at least a food/beverage cup with a handle, extends perpendicularly and inwardly from sidewall 12 in spaced, parallel relationship to the bottom panel 16. An external support shelf 20 used for supporting accessories projects orthogonally and outwardly from the sidewall 12 and is bolstered by two spaced triangular shelf supports 22 which are typically attached by fasteners 24 to sidewall 12.

Each of the sidewalls 12, 14 is formed with a retaining arrangement for holding a number of panels between the sidewalls 12, 14. In particular, inner surfaces of front portions or legs 26 of sidewalls 12, 14 are provided with retaining grooves 28 which extend from the upper edges to the lower edges of the sidewall front portions 26. A set of grooves 30 is provided on the inner surfaces of sidewalls 12, 14 between front portions 26 and rear portions 32. In addition, inner surfaces of rear portions or legs 32 of the sidewalls 12, 14 are cut with retaining grooves 34 which run from the upper edges to the lower edges of the sidewall rear portions 32. Front portions 26 of sidewalls 12, 14 are larger than rear portions 32.

The organizer 10 includes a series of five vertically disposed, parallel panels preferably constructed of a transparent material, such as Plexiglas, for defining a plurality of adjacently disposed, readily visible and accessible, open-topped storage compartments. A front panel 36 has outer edges secured to front faces of the sidewalls 12, 14 such as by fasteners 38. The front panel 36 is also attached by fasteners 40 to the front surface of the internal support shelf 18. A bottom edge of the front panel 36 is engaged against the front edge of the bottom panel 16. A top portion of the front panel 36 is formed with a generally rectangular cut-out 42 which extends downwardly towards the upper surface of the internal support shelf 18. The cut-out 42 is conveniently provided to receive the handle of a dispensing container such as a coffee cup which is adapted to rest on the support shelf 18.

A first interior panel 44 is slidably received and held in place within the retaining grooves 28. When in position, the panel 44 has a front surface which lies flush against a rear surface of the support shelf 18, and an upper edge which rises above the upper limits of the sidewalls 12, 14. As best seen in FIG. 4, the panel 44 is connected to the rear surface of support shelf 18 by fasteners 46.

A second interior panel 48 is slidably inserted and positioned within the retaining grooves 30. Front panel 36 and interior panel 48 have generally the same height. Both panels 36, 48 have top edges which lie beneath the top edge of panel 44. A third interior panel 50 is slidably retained in retaining grooves 34, and spaced rearwardly of interior panel 48. A rear panel 52 has outer edges joined by fasteners 54 to rear faces of the sidewalls 12, 14 as illustrated in FIG. 4. Top edges of panels 50, 52 have elevations which are lower than panels 36, 44 and 48.

In a preferred use, the organizer 10 is conveniently used in the cab of a semi-tractor by a professional driver to hold and enable access to a variety of items. It should be understood that the organizer 10 may be used in other applications as desired. It has been found that the storage compartments between panels 44 and 48, 48 and 50, and 50 and 52 are useful in holding and managing a truck driver's paperwork, including, but not limited to, driver log books, delivery manifests, folders, envelopes, notebooks, etc. The storage compartment between panels 44 and 48 is especially convenient for storing a large map. The internal support shelf 18 is designed to hold a coffee cup with a handle that protrudes towards the driver so that it may be easily grasped. The cut-out 42 throughwhich the coffee cup handle extends tends to retain the coffee cup from sliding laterally on the shelf 18. The area rearwardly of the shelf 18 backed by panel 44 is of utility in storing a larger beverage container such as a thermos directly behind the shelf 18. Further space behind the thermos in the storage compartment defined by panels 36 and 44 may be filled with other items such as a second thermos and cleaning products, such as a window cleaner. Further storage space is available beneath the support shelf 18. The external support shelf 20 is provided to add support for miscellaneous items desired by the truck driver, such as adjustable cup holders, pen holders, coin holders, tape/CD holders and the like. Such holders can be attached to shelf 20 by means of hook and loop fasteners, drilling a hole and using fasteners, a belt buckle or any other suitable fastening aids. Other accessory items that can be clipped on any of the panels 36, 44, 48, 50, 52 can be used to hold air fresheners, cell phones, sun glass holders, flashlight holders and storage pouches, for example. The storage pouches may hold a particular item or may be used to collect refuse to maintain the tidiness of the vehicle. It should also be noted that the shape of the storage compartments between the panels 36, 44, 48, 50, 52 is conducive to holding scanners, radar detectors, laptops, PDA's, video games, cameras, food trays and other items desired in the cab by the driver and/or passenger.

It is a particular feature of the invention that the panels 36, 44, 48, 50, 52 are transparent enabling the driver to readily take inventory of and then access what is stored in the organizer 10. It is a further feature that the internal support shelf 18 and the external support shelf 20 are oriented towards the right hand of the driver to make those areas more accessible without requiring undo reach of the driver. It is also a feature of the invention that the organizer 10 is portable and may be moved to other vehicles if desired. The organizer is economical and relatively simple to manufacture.

Thus, the present invention provides a uniquely designed organizer that is particularly adapted for use on the cab floor of a semi-tractor or truck. The organizer produces a safe and convenient storage facility with a variety of compartments that are readily visible and accessible to the driver. Although not shown, the organizer could include handles on the sidewalls 12, 14 to improve the handling should it be desirable to transport the filled organizer in and out of the truck. If desired, at least interior panels 48, 50 may be slidably removed to clean out the interior of the organizer 10. It should be appreciated that the exact arrangement of the storage compartments and the placement of panels may be varied to suit the various users. It should also be understood that various other materials may be used to construct the organizer 10.

Various alternatives and embodiments are contemplated as being within the scope of the following claims particularly pointing out and distinctly claiming the subject matter regarded as the invention.

We claim:

1. An organizer adapted to store and manage various items in a vehicle comprising;

a pair of spaced apart sidewalls interconnected by a bottom panel, each sidewall having a front face and a rear face, one of the sidewalls adapted to be oriented towards the driver of the vehicle having an internal support shelf extending inwardly from and permanently fixed to the one sidewall only, and an external support shelf projecting outwardly from and permanently fixed to the one sidewall only and raised above the bottom panel; and a series of vertically disposed, spaced-apart, parallel panels engageable with the bottom wall and extending completely between the sidewalls at various locations between the front faces and rear faces of the sidewalls for defining a series of adjacently disposed, completely open-topped storage compartments adapted to hold the various items in the vehicle;

wherein the vertically disposed panels include a front panel fixed to the front faces of the sidewalls and fixedly attached to the internal support shelf, and a rear panel fixed to the rear faces of the sidewalls, the front panel being formed with a cutout extending downwardly from a top edge and adapted to receive a handle of a cup adapted to be held on the internal support shelf, wherein the vertically disposed panels further include a first interior panel connected to the internal support shelf and having side edges retained in front portions of the sidewalls, a second interior panel spaced rearwardly of the first interior panel and having side edges retained in the front portions of the sidewalls, and a third interior panel spaced rearwardly of the second interior panel and having side edges retained in rear portions of the sidewalls, the front panel and the second interior panel having generally identical height, the first interior panel having a height greater than a height of any of the other vertically disposed panels, the third interior panel and the rear panel having heights less than the heights of the front panel, the first interior panel and the second interior panel.

2. The organizer of claim 1, wherein the bottom panel and the vertically disposed panels are transparent.

3. The organizer of claim 2, wherein the internal surfaces of the sidewalls are formed with retaining grooves for slidably receiving and retaining certain of the vertically disposed panels.

4. A readily visible and open-topped organizer adapted to be used for storing and managing items in the cab of a semi-tractor vehicle comprising:

a pair of spaced-apart, generally L-shaped sidewalls interconnected by a transparent bottom panel, each sidewall having a front face and a rear face and having internal surfaces formed with spaced-apart retaining grooves, one of the sidewalls adapted to be oriented towards a driver of the vehicle having an internal support shelf extending inwardly from and permanently fixed to the one sidewall only, and an external support shelf projecting outwardly from and permanently fixed to the one sidewall only and raised above the bottom panel, and a series of vertically disposed, spaced-apart part, parallel transparent panels engageable with the bottom wall and extending between the sidewalls at various locations between the front faces and the rear faces of the sidewall for defining a series of adjacently disposed, completely open-topped storage compartments adapted to hold paperwork and various items in the vehicle, certain of the vertically disposed panels being fixed to the front and rear faces of the sidewalls and other vertically disposed panels being slidably retained within the retaining grooves formed in the internal surfaces of the sidewall, wherein the internal support shelf is located between one of the fixed panels and one of the slidably retained panels, and wherein one of the fixed panels has a cut-out adapted to receive a handle of a container which is adapted to be supported on the internal support shelf;

wherein the fixed panels include a front panel fixedly attached to the internal support shelf, and formed with the cutout extending downwardly from a top edge, the fixed panels also including a rear panel spaced from the front panel, wherein the slidably retained panels include a first interior panel connected to the internal support shelf, a second interior panel spaced rearwardly of the first interior panel, and a third interior panel spaced rearwardly of the second interior panel, the front panel and the second interior panel having generally identical height, the first interior panel having a height greater than a height of any of the other vertically disposed panels, the third interior panel and the rear panel having heights less than the heights of the front panel, the first interior panel and the second interior panel.

* * * * *